United States Patent

Pahl

[11] 4,117,867
[45] Oct. 3, 1978

[54] HIGH PRESSURE HOSE COMPOSED OF ELASTOMERS AND EMBEDDED REINFORCEMENTS

[75] Inventor: Karl-Heinz Pahl, Düsseldorf-Lohausen, Fed. Rep. of Germany

[73] Assignee: Pahl'sche Gummi-und Asbest-Gesellchaft PAGUAG, Düsseldorf, Fed. Rep. of Germany

[21] Appl. No.: 698,564

[22] Filed: Jun. 22, 1976

Related U.S. Application Data

[63] Continuation of Ser. No. 492,558, Jul. 29, 1974, abandoned.

[30] Foreign Application Priority Data

Aug. 1, 1973 [DE] Fed. Rep. of Germany ....... 2338948

[51] Int. Cl.² .............................................. F16L 11/00
[52] U.S. Cl. ..................................... 138/119; 138/177
[58] Field of Search ............... 139/109, 119, 177, 137, 139/174

[56] References Cited

U.S. PATENT DOCUMENTS 1,906,612  5/1934  Winning ............................... 138/137
3,275,039  9/1966  Corbett ............................... 138/119

Primary Examiner—Houston S. Bell, Jr.
Attorney, Agent, or Firm—Burgess, Dinklage & Sprung

[57] ABSTRACT

High pressure hose made of elastomers and reinforcing inserts having an inside diameter greater than 50 mm and a unit construction in the longitudinal direction of any desired length of at least 100 m. Such high pressure hoses made by continuously constructing the hose on a stationary mandrel over which the hose rollingly or slidingly pulled off in the direction of production with low friction.

7 Claims, 13 Drawing Figures

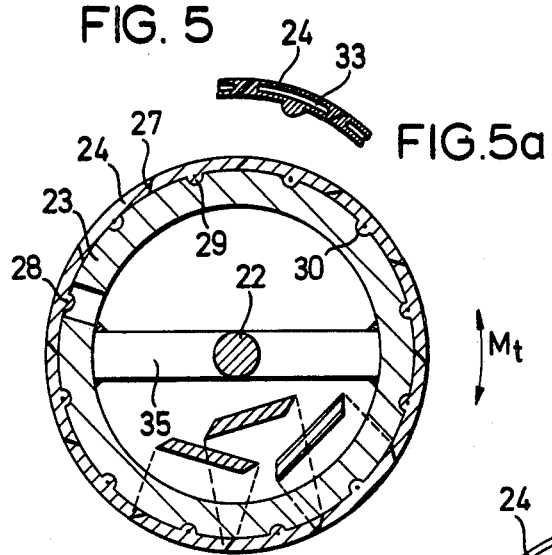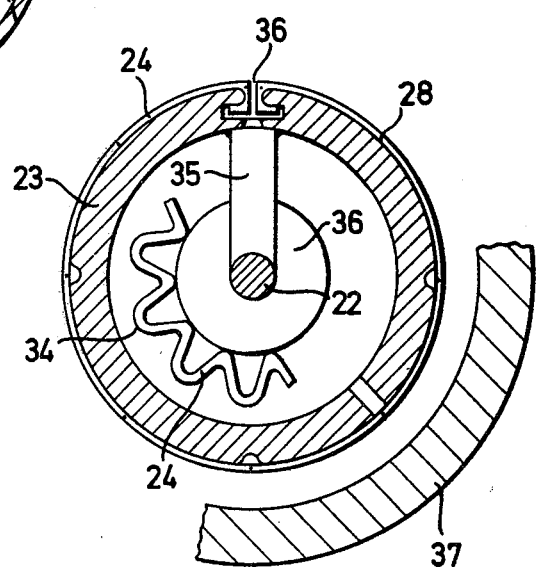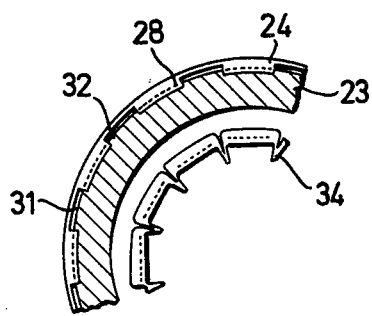

HIGH PRESSURE HOSE COMPOSED OF ELASTOMERS AND EMBEDDED REINFORCEMENTS

This is a continuation of application Ser. No. 492,558, filed July 29, 1974, now abandoned.

BACKGROUND

The invention relates to high pressure hoses made of elastomers and reinforcements with an inside diameter greater than 50 mm, a continuous longitudinal construction, and any desired length. The invention furthermore concerns methods of manufacturing such high pressure hoses.

It is known to manufacture high pressure hose lines of great length by coupling together a large number of individual lengths. These lengths, however, are short, and the large number of fittings used to assemble them constitute an unacceptable point of weakness and interfere with the cleaning of the line.

In exploration for natural gas and oil in coastal regions conduits are required for the transport of the oil or gas from points of discovery in the ocean to points of use, such conduits consisting normally of steel pipe. In cases where great depths and greatly fissured ocean bottoms are involved, the use of steel pipe is subject to limitations. The flexibility and resilience of steel pipe are inadequate where differences in level are steep or abrupt. In addition, the assembly of steel pipelines in the case of great ocean depths is made difficult by the finite length of the individual steel pipes of 12 to 18 meters on account of the large numbers of annular welds required. At great ocean depths there is also the danger that the great hydrostatic pressure may permanently deform the steel pipes precisely while they are being laid. The wall thicknesses must therefore be proportioned accordingly. A very great volume of freight space must be available for the transportation of the steel pipes to the places where they are to be laid. It is for these reasons that steel pipelines have hitherto been laid only in relatively shallow waters to depths of about 200 meters.

Large tubes made of elastomers and constructed in a manner similar to high pressure hoses are suitable for spanning great ocean depths. Tubes of this kind are used in the high pressure art for the accommodation of high internal pressures at relatively small diameters and short lengths. The technical requirements which must be met by a submarine pipeline at great depths, however, cannot be fulfilled by the hose designs which have been known hitherto. First, of course, materials must be selected for the "pipe design" which are resistant to sea water. The external surfaces of the tubes must not be attacked by sea water even after years of use. In addition, the surface must be so prepared as to inhibit incrustation by sea animals insofar as possible. To span irregular shoals it is necessary to provide lengths of many kilometers, even when the diameters of the tubes are great, and they may be of the order of 300 to 1000 millimeters. It is very important to use the greatest possible individual lengths of tubing in order to reduce the number of welds between the ends of the tubes, insofar as is technically possible.

This goal can be attained, however, only if the transportation problems which occur where large diameters and long transportation hauls are involved are simultaneously solved. A "tube" in the above-named diameter range cannot be transported in the straight condition, with an individual length of, for example, 100 m, by conventional means. It must therefore be wound like a hose in a known manner. At the large hose diameters desired, the drum diameter required for the hose designs known heretofore would also become too large to be transportable.

The known methods of manufacturing high-pressure hoses of laminated materials with a resilient supporting material can be divided basically into the mandrel processes and the mandrel-less processes.

In mandrel manufacturing processes the individual components of the hose, such as the core, the reinforcement and the covering, for example, are applied individually to a mandrel of finite length serving as a mold core. The mandrel length is limited for reasons of easier "strippability," and amounts as a rule to from 20 to 40 meters. In discontinuous manufacturing, a solid steel mandrel is usually used for small hose diameters, and an aluminum tube is used in the case of larger diameters on account of greater ease in handling (German Pat. No. 521,266).

The mandrel-less processes are the only ones which heretofore have permitted the continuous production of hose in any desired because the limitation of length due to the necessity of stripping the hose from the mandrel is eliminated. The construction of the hose in the assembly phase is performed in this case on a slightly compressed fluid, which is air as a rule. The establishment of the hose dimensions is achieved in these processes through the outside diameter in that, prior to the heating, a lead jacket is applied, for example, and is continuously removed again after the heating. In contradistinction to the mandrel process, the accuracy of the inside diameter in this case depends very greatly on the material and machinery parameters. Furthermore, the mandrel-less processes known today are economically applicable only where large quantities of hose and small hose diameters are involved (periodical "Kautschuk and Gummi", February 1963, DK 678.06: 621.643.3).

For the manufacture of high pressure hoses of great and very great dimensions, the mandrel process has been used exclusively hitherto. The reason for this is not so much the required constancy of the inside diameter, but essentially two facts: The metal or textile reinforcement necessary for the construction of the hose must be applied under tension, which in the case of the mandrel-less process would result in an unacceptable constriction of the core. An increase of the supporting air pressure is not possible in such cases, since this would likewise result in a deformation of the core, even though it would be in the opposite direction. On the otherhand, jacketing with lead during the heating would result in manufacturing costs which would not be economically acceptable.

THE INVENTION

The invention is addressed to the problem of making available great lengths of high pressure hose produced from laminated materials with a resilient supporting material. A special object is the production of large-size flexible tubes which can be laid as resilient pipelines in a technically simple manner by means of apparatus such as can be contained in ships, for example.

These problems are solved in accordance with the invention by high pressure hoses composed of elastomers and reinforcements and having inside diameters in excess of 50 mm, which are characterized by continuous construction in any desired length of at least 100 meters.

The high pressure hoses of the invention may have a reinforcement to maintain their stability of shape under high external pressure. According to a preferred embodiment, they are reversibly collapsible under external pressure, deforming their cross section to a flat oval and more.

The high pressure hoses of the invention, if not of a circular cross section, may have a principle axis of inertia whereby they are given a definite plane of collapse and twisting is prevented.

The high pressure hoses of the invention may have one or more tension supports extending longitudinally for the accommodation of the longitudinal forces. These are located preferably on the principal axis of inertia. In the area of the thickening located on the principal axis of inertia the high pressure hose of the invention, in a preferred embodiment, has recesses at intervals.

According to another preferred embodiment, the hose extremities have material thickenings for the fastening of terminal fittings without impairing strength. The high pressure hose of the invention is preferably so constructed that the permeability of the material used in its construction to harmful components of the matter being pumped through it increases from the inside to the outside.

The method of the invention for the continuous production of high pressure hoses is characterized by the fact that the hose is built up on a stationary mandrel over which the hose is pulled rollingly or slidingly in the direction of production.

According to a preferred embodiment, the stationary mandrel is composed wholly or partially of a roller mandrel rotating about its long axis. In another variant of the method of the invention, the stationary mandrel is made wholly or partially in the form of a hydrostatic or aerostatic bearing. The stationary mandrel used in the method of the invention may bear on its entire surface one or more endless bands of heat-resistant, flexurally resilient material revolving under an external drive or driven by the movement of the hose in the direction of production. Additional preferred embodiments will be understood from the following description.

In the process of the invention the hose is made on a stationary mandrel whose surface is driven along in the direction of production with the least possible friction by the hose being built upon it. Such a mandrel is a fixed component of the actual hose machine and thus is present only at the beginning of the production area and extends as far as the heating zone if any. It may consist of one or more partial sections, depending on the particular embodiment, such that the mandrel segments, as seen in the direction of production, are fixedly joined to one another and are present only where the application of a new layer of material on the hose, especially a layer of wound cord or the heating coil, produces a pressure directed towards the interior of the hose has to be counterbalanced in order to prevent deformation of the circular cross section.

DESCRIPTION OF THE DRAWING

The present invention will be more fully understood from the following description taken in conjunction with the accompanying drawing wherein:

FIG. 5 is a sectional view taken along line A-B of FIG. 4;

FIG. 6 is a cross-sectional view taken along line A-B of FIG. 3;

FIG. 7 is a partial sectional view showing an alternate embodiment of the apparatus shown in FIG. 6;

DESCRIPTION

Figure 1:
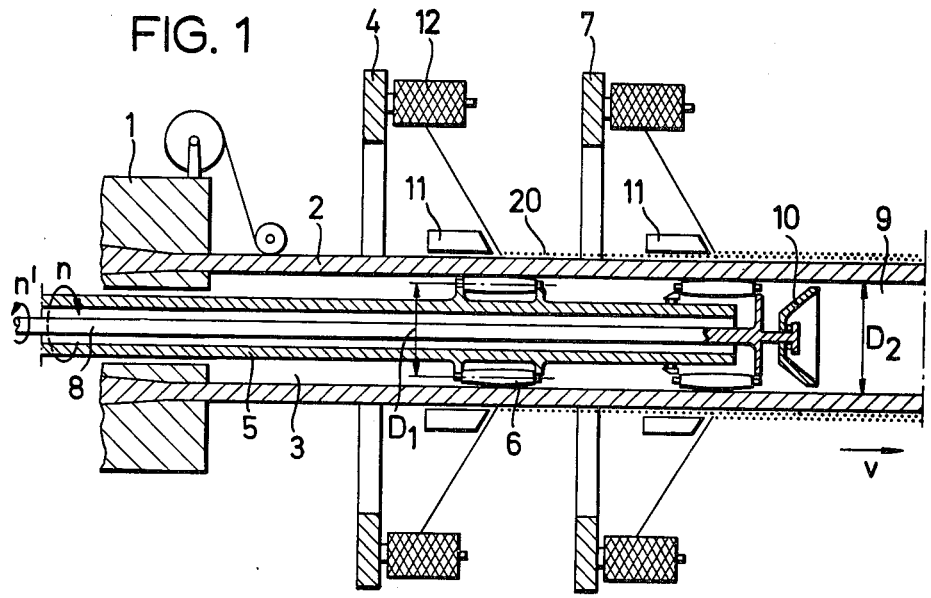
FIG. 1 is a side view in cross-section of one embodiment of apparatus of the invention for carrying out the method thereof.

The process of the invention may be performed in three principal variants:

(a) With a roller mandrel as in FIG. 1

The hose core 2 leaving the extruder 1 is kept circular by a slight air pressure in its interior 3 and is cooled as greatly as possible before the next procedure. At a constant speed $v$ it reaches the first hose wrapping machine 4 where it is wrapped with a layer of corded or braided yarn or wire. These layers must be made in an extremely precise and repeatable manner in a high pressure hose, and therefore any construction of the soft and unstable core must be prevented under all circumstances.

This can be achieved in accordance with the invention by means of a circular array of rollers 5 which will revolve advantageously in the opposite direction from that of the cording or braiding machine 4. The roller array 5 consists of the largest possible number of slightly rounded rollers 6 whose axis of rotation will slant to a variable degree in relation to the center line of the hose. For a given slant of the rollers 6 and a given hose extrusion speed $v$ the rotatory speed $n$ of the roller array 5 is adjusted such that the rollers 6 will roll helically against the inside surface of the hose 2.

The diameter of the roller array $D_1$ is also variable so as to be able to be able to produce the greatest possible number of types of hose with the same roller mandrel. In addition, the inside diameter of the hose $D_2$ can also be corrected in this manner during production.

If a suporting mandrel is also required in the second cording or braiding machine 7, one can be made to rotate contrary to the first one through a flexible driveshaft 8.

After the application of two layers of textile yarn or wire, the hose under construction is usually so resistant to pressure that a pressure of several atmospheres in its interior 9 will suffice for any further support. It would be advantageous for this pressure medium to have the temperature required for the later heating of the hose.

To provide a seal between sections 3 and 9 of the hose interior, a sliding seal 10 is rotatably fastened to the last roller array 5.

In cases where the torque transmitted to the hose 2 by the winder 4 or 7 is not counterbalanced by an equal torque provided by the roller mandrel 5, an anti-rotational means 11 must be provided in order to prevent twisting of the hose 2 and the inaccurate laying of the reinforcement wrapping. This antirotational means is advantageously a junction of interlocking form between the hose surface and a plurality of edges cutting into same or grooved rollers rolling thereon. The point of engagement of the antirotational means is to be as close as possible to the point at which the wrapping is laid on.

Figure 2:
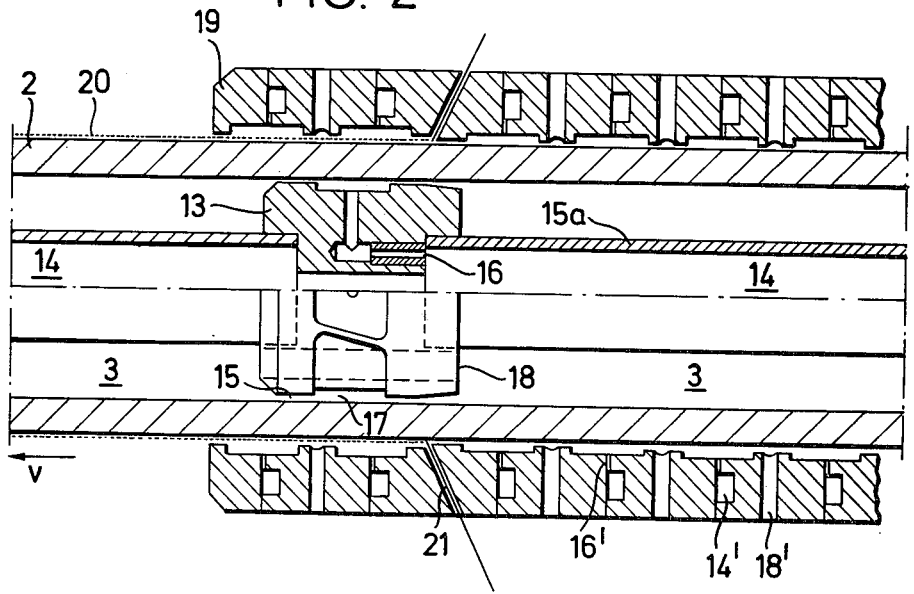
FIG. 2 is a side view in cross-section of another embodiment of the apparatus of the invention for carrying out the method thereof.

(b) With a hydrostatic or aerostatic mandrel as represented in FIG. 2

The extruded and cooled hose core 2 is protected against collapse at one or more points of action of external forces by a supporting mandrel 13 of fixed location which may be made to rotate on its axis. To prevent contact between the hose core 2 and the mandrel surface a gap 15 filled with a supporting medium 14 must be maintained. This supporting medium flows under pressure through an infeed tube 15a and capillaries 16 into a plurality of air pockets 17 and expands from there through the annular gap 15 into the interior 3 of the hose whence it returns through return bores 18 back to the compressor.

As in the method described in (a), in all cases where the hose cross section does not have sufficient stability of shape, an additional external supporting means 19 must be used. This can advantageously be in the form of an aerostatic bearing, since a film of liquid between the core 2 and the reinforcement 20 is incompatible with hose quality. In this manner the hose 2 will glide with low friction and at a constant speed v between the two stationary bearings 13 and 19. The external bearing 19 is advantageously part of the coil holder 12 of the hose wrapping machine 4 and 7 and has at its forward side guiding bores 21 for admission of the wrapping. In this manner a support can be provided which will fully envelop the exterior of the hose except for the point at which the wrapping is laid on.

Figure 3:
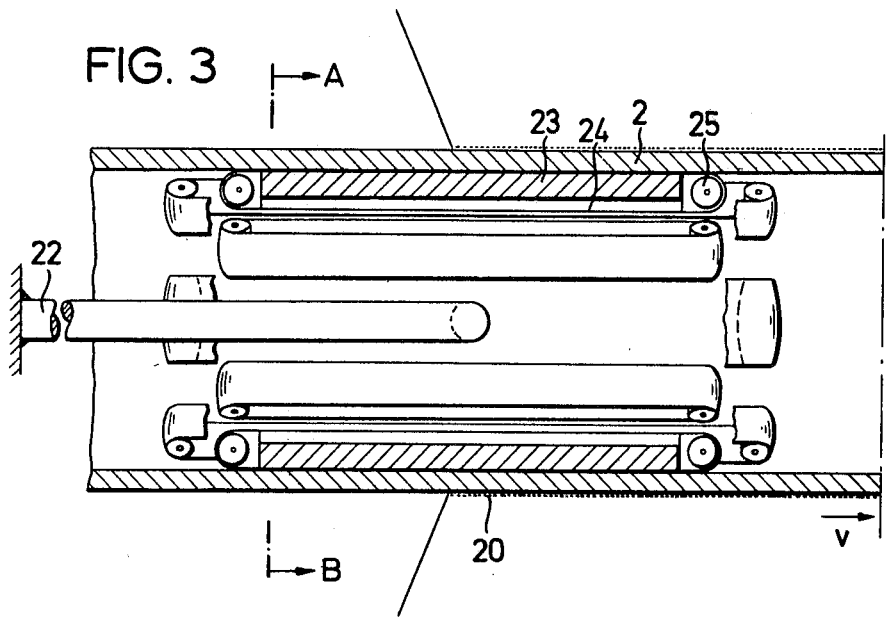
FIG. 3 is a side view in cross-section of yet another embodiment of apparatus of the invention for carrying out the method thereof.
Figure 4:
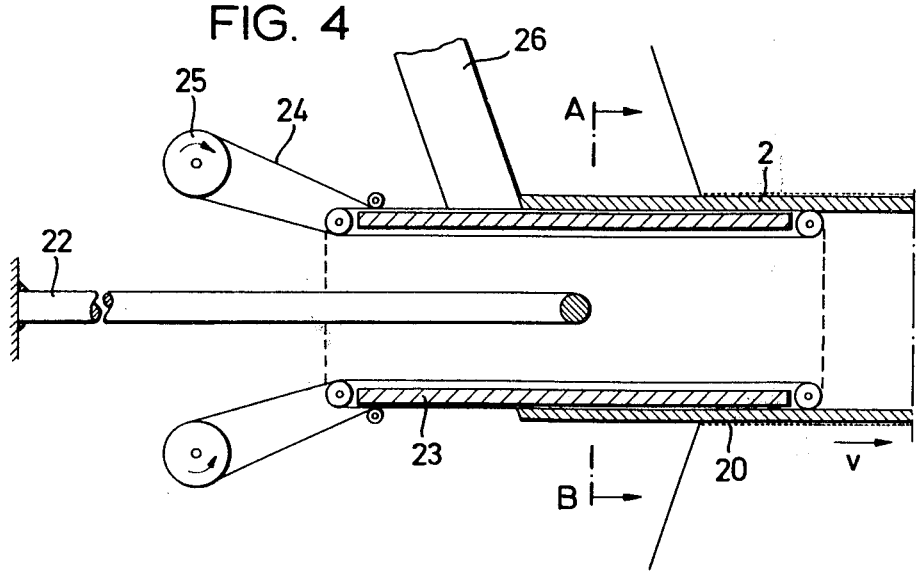
FIG. 4 is a side view in cross-section of a further embodiment of apparatus of the invention carrying out the method thereof.

(c) with a stationary mandrel 23 acting as a gauge, as illustrated in FIG. 3, on whose surface a plurality of endless flexible bands 24 glide with low friction, driven in the direction of production by the hose 2. To this end it is required that the friction between the inner side of the core 2 and the outside of the bands 24 is considerably greater than the friction between the bands 24 and the mandrel 23. If, nevertheless, the sliding friction under certain circumstances of production is too high, the bands may additionally be driven by a means 25 at the hose movement speed v. Particularly in the case of the smaller hose inside diameters it is difficult to provide a suitable driving means in the interior of the mandrel, for reasons of space limitation. In these cases the drive means 25 can be located on the exterior (see FIG. 4). Such an arrangement is also advantageous when the hose core is not extruded but is wound from strips 26.

The construction of the endless bands 24 is various and will depend on the degree to which the hose core must be free of fluting (FIGS. 5, 6, 7). FIG. 5 is a cross-sectional view taken along line A-B through the mandrel in FIG. 3 or FIG. 4. The mandrel surface 23 bears a plurality of endless bands which are stiff longitudinally, but are flexible about their center line such that they easily conform to the curvature of the mandrel. The bands are shaped at their lateral meeting edges 27 such that they are pressed tightly together by the action of an external pressure. On their bottom sides they have longitudinal guiding beads 29 which mate with correspondingly shaped recesses in the surface of the mandrel 23 for the purpose of preventing lateral displacement of the bands under the action of a torque $M_t$. Likewise, the recesses 31 [FIG. 7] may also be located on the underside of the bands and run on corresponding guiding ridges 32 on the mandrel surface (FIG. 7). To reduce the friction between bands 24 and mandrel 23, lubricant can be fed through bores.

In the case of nonmetallic bands 24 it is advantageous to provide one or more tension supports 28, of steel cord for example, extending longitudinally within the cross section.

In cases in which the hose is surrounded after production with a heating coil, it is possible, for the purpose of exerting an external pressure on the hose cross section during the heating for the achievement of better quality, to increase this pressure still further by filling the interior 33 of the bands 24 with gas or liquid. In this case the bands must be made of a resilient material which permits the desired increase in the thickness of the band through thermal expansion of the filling substance.

No matter how well the bands 24 meet at the edges 27, these edges will inevitably leave some impression in the form of a line on the inside of the finished hose. However, to reduce the number of such lines and hence the resistance to flow when the hose is in use, the number of bands moving on the surface of the mandrel must be kept as small as possible, and in the extreme case there will be only one (FIGS. 6 and 7). To facilitate the return of the endless belt at the ends of the mandrel 23 the band can have either entirely (FIG. 6) or only partially (FIG. 7) a small thickness, so that its cross section which is circular at the surface of the mandrel can easily be pleated together at the end of the mandrel and thus return through the interior of the mandrel, as shown at 34.

In order to hold the entire mandrel system 23 in its place in the direction of hose movement, the mandrel must be joined by crosspieces 35 to a mandrel mounting support 22. Since on its way through the interior of the mandrel the band 24 must pass around these crosspieces, its circular cross section is interrupted at least at one point 36. This could be eliminated if it is possible to hold the mandrel 23 in its axial position, not mechanically 22, 35, but by a strong magnetic field acting on it from the inside 36 and/or from the outside 37 (FIG. 6). A hose made in this manner would be absolutely free of ridges on its interior and could not be distinguished in this regard from a conventionally made mandrel hose.

Figure 8:
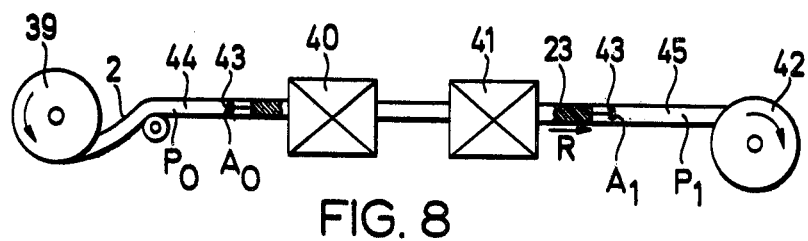
FIG. 8 is a schematic flow scheme illustrating one manner for carrying out the process of the invention.

An axial fixation of the mandrel without a mandrel mounting support 22 is also necessary in cases in which the hose core 27 is made in a separate procedure (FIG. 8). The core 2 being fed from a drum 39 passes through the fabricating zone 40 and the heating zone 41. The finished hose is cooled and then wound on the drum 42.

In order to be able to operate a quasi-continuous manufacture "mandrellessly" in this case, too, the tube section 23 bearing the endless bands 24 must be able to be locked to the hose machine in the axial direction without screw fastening. This can be accomplished magnetically in accordance with FIG. 6 or hydraulically (FIG. 8) in a positive manner. In the case of hydraulic mandrel locking, the ends of the mandrel bear, on the crosspieces 35 and the mounting 21, piston faces $A_0$ and $A_1$ 43, which seal the hose interiors 44 and 45 from one another. The gas or liquid pressures in these interiors are connected to one another through a controlling mens such that the force $P_1A_1 - P_0A_0$ resulting from the products of pressure and piston area preserves at all times an equilibrium with the friction force R acting between the bands 24 and the mandrel 23. The axial position of the mandrel 23 can be verified by the known methods of nondestructive material testing—by X-rays for example—and can be corrected by means of the differential pressure control described above.

Since the unprotected core 2 is not able to withstand any great internal pressure in section 44 without unacceptable deformation, the internal pressure also can be made equal to the atmospheric pressure, thereby eliminating the front piston face $A_0$.

In many cases it may be quite advantageous to combine the above-described methods (a), (b) and (c). For example, in the case of a hose whose first reinforcing layer has been applied by method (c), the hose cross section is already so stable that, in the course of production the rest of the layers can be laid by method (b) or, under certain circumstances, with the use of a gaseous or liquid filling in the interior of the tube, this can easily be accomplished if the media are kept separate by means of one or more suitable seals 10.

Figure 9:
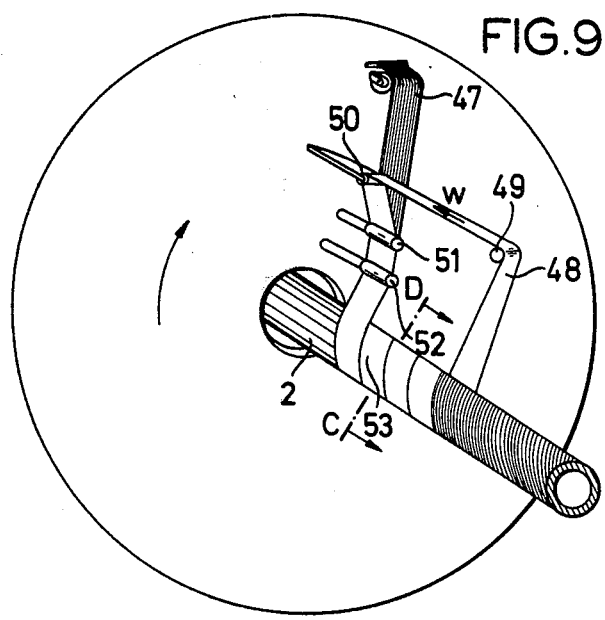
FIG. 9 is a perspective view of apparatus for carrying out the invention.
Figure 9A:
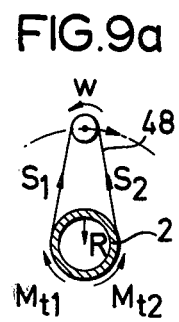

In any of methods (a) to (c) it is possible that, despite the measures described, an excessive torque may be applied to the hose cross section, especially by the application of the various reinforcements and the concomitant action of external forces in the direction tangential to the outside diameter of the hose. It is the purpose of the system represented in FIG. 9 to counteract this torque to the greatest possible degree with an approximately equal torque in the opposite direction, and to transform the unwanted external forces into internal ones.

This is achieved substantially by the fact that an adjacent endless and flexible belt or an endless and flexible belt 48 being wound about the hose in the same direction and simultaneously with the strand or with a set 47 consisting of a plurality of reinforcing wires or cords acts by friction to counterbalance a certain portion of the reinforcement wrapping tension. This effect is made possible by a rough surface on the belt 48 on the one hand, and by the speed difference between 47 and 48 on the basis of the difference in their wrapping diameter on the hose 2. As represented in cross section C-D of FIG. 9, the endless belt 48 revolving at the speed $w$ produces a force $S_1$ which engages the tube 2 as a tangential tension force and exerts a torque $M_{t1}$ on the tube. When by the driving or braking of the pulley system 49-52 the unwinding force $S_2$ of the belt 48 is kept equal to the winding force $S_1$, then the torque $M_{t2}$ produced thereby will also be equal to $M_{t1}$, and the external force applied by the belt will result in a constriction of the portion 53 of the belt spiralled onto the hose and in a static force R which produces no torque. This static reaction force R is counterbalanced by the stationary mandrel of methods (a) to (c).

Figure 10:
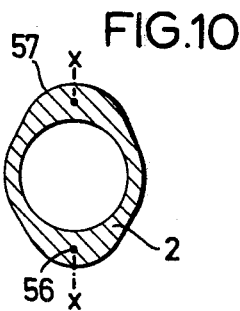
FIG. 10 shows high pressure hose made according to the present invention.
Figure 10A:
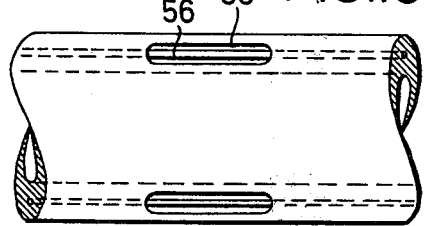

When large pipes of high polymers are used in deep sea regions, the assembly of the lines is performed at no pressure. The pressure used in the pumping of natural gas and oil, which is approximately 55 to 75 atmospheres gauge pressure cannot be applied until after the entire pipeline is completed. Up to the time of start-up, the hydrostatic pressure of the water is applied to the full extent. The parts of the pipeline therefore assume the flat oval shape used in transporting it. The circular shape is not attained until the desired final pressure has been achieved at the desired depth in the ocean. To prevent the hose from twisting while it is compressed, the hose may have a cross section differing from the circular (FIG. 10). By means of thickened portions 57, a principal axis of inertia $x$—$x$ can be vulcanized in, which will give the hose a defined plane of collapse when it is compressed. The longitudinal tension reinforcements 56 are advantageously located in this plane.

When such a pipeline is laid floatingly at great ocean depths, the buoyancy of the hose must be compensated by counterweights. For the application of these counterweights or to prevent their displacement longitudinally, the hose has recesses 58 at intervals.

When the above-described flexible pipelines are laid at great ocean depths, it is more economical to design the cross section of the pipeline not on the basis of the desired absolute internal operating pressure, but to design it only for the prevailing differential pressure. Thus, for example, a hose having a nominal pressure rating of at least 20 kp/cm$^2$ will suffice for use at an internal working pressure of 70 kp/cm$^2$ in that portion of the pipeline that is laid deeper than 500 meters in the ocean. The hydrostatic water pressure of about 50 kp/cm$^2$ will all the more severely deform the hose designed for only 20 kp/cm$^2$ when it is laid in the unpressurized state, and thus must be taken into account in designing it; on the other hand, however, greater individual lengths can be transported on the same drum to the worksite.

In accordance with the invention, the steel wire or other reinforcements are so embedded in rubber, for example, that the individual reinforcing elements will not be permanently deformed by the above-described changes of shape from the flat oval to the circular shape and vice versa.

For this purpose the wall thickness of the hose core must be made so thick that even under extreme deformations of its cross section it will not be bent beyond the acceptable bending radius of the reinforcing elements used.

By the method of the invention, the advantages of the mandrel process, especially the accommodation of great deforming forces during manufacture, the precise establishment of the inside diameter, the economical and flexible production even of small lots are combined with the advantages of the mandrelless process, especially the production of any desired hose lengths.

By the method of the invention it is now possible to produce a high pressure hose of any desired construction, having a mainly circular but not necessarily circular cross section, continuously in large quantities, and at the same time to achieve the same quality characteristics of a hose produced on a mandrel.

By the invention, however, it can also be brought about that the hoses will be able to be wound in a flat oval shape, that is, in a drive-belt-like shape, on drums without permanently deforming their inner structure, especially their steel wire reinforcement. This permits the rational transportation of high pressure hoses in very great individual lengths.

What is claimed is:

1. A high pressure hose for use in conveying fluids therein when said hose is under high hydrostatic pressure imposed by a body of water thereabove, said hose made of an elastomeric material and having reinforcing inserts therein, said hose having an inside diameter greater than 300 mm and a jointless length of at least 100 meters.

2. A high pressure hose according to claim 1 having a nominal pressure rating of at least 20 bar.

3. A high pressure hose according to claim 2 having at least one reinforcing layer of tension supports disposed longitudinally within the walls of said hose or on the exterior thereof, said hose having a defined plane of collapse whereby said hose can be wound upon a reel in a collapsed state.

4. A high pressure hose according to claim 1 having an interior circular cross-section in its expanded state.

5. A high pressure hose according to claim 4 wherein the inside diameter is 300—1,000 mm.

6. A high pressure hose according to claim 5 having reinforcing bars along the length thereof sufficient that the hose has a specific gravity high enough that when said hose is disposed on a body of water it will sink.

7. A high pressure hose according to claim 6 wherein said hose is flexible and reversely collapsible under external pressure deforming the cross-section of said hose to a flat oval.

* * * * *